A. F. BATCHELDER.
ELECTRIC LOCOMOTIVE.
APPLICATION FILED APR. 30, 1909.

1,008,580.

Patented Nov. 14, 1911.

WITNESSES:
W. Ray Taylor.
J. Ellis Ken—

INVENTOR:
ASA F. BATCHELDER
BY
ATTY.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC LOCOMOTIVE.

1,008,580.  Specification of Letters Patent.  Patented Nov. 14, 1911.

Application filed April 30, 1909. Serial No. 493,093.

*To all whom it may concern:*

Be it known that I, ASA F. BATCHELDER, a citizen of the United States, residing at Schenectady, in the county of Schenectady and State of New York, have invented certain new and useful Improvements in Electric Locomotives, of which the following is a specification.

My invention relates to electric locomotives and particularly to two-truck locomotives.

The object of my invention is to provide in a two-truck locomotive an arrangement of driving motors such that the weight of the same shall be concentrated as near the middle of the locomotive as possible in order to decrease the moment of inertia of the locomotive about a vertical axis through its center, thereby to relieve the lateral hammer blows of the leading wheels of the locomotive upon the rails due to "nosing" action.

In carrying out the above mentioned object of my invention, I drive the wheels of each truck of a two-truck locomotive by a motor arranged in coöperative relation to the pair of wheels in each truck which is nearest the other truck, driving connections being provided between these wheels and the other wheels of that truck. By this arrangement the motors are located near the middle of the locomotive and the ends of the trucks nearest the ends of the locomotive may be made light.

Figure 1:
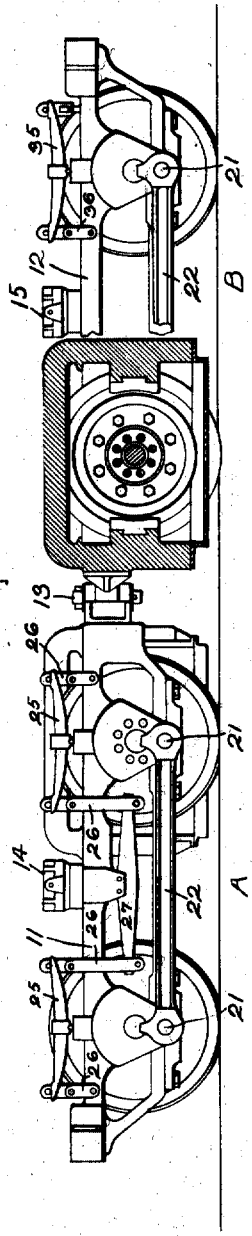
Figure 2:
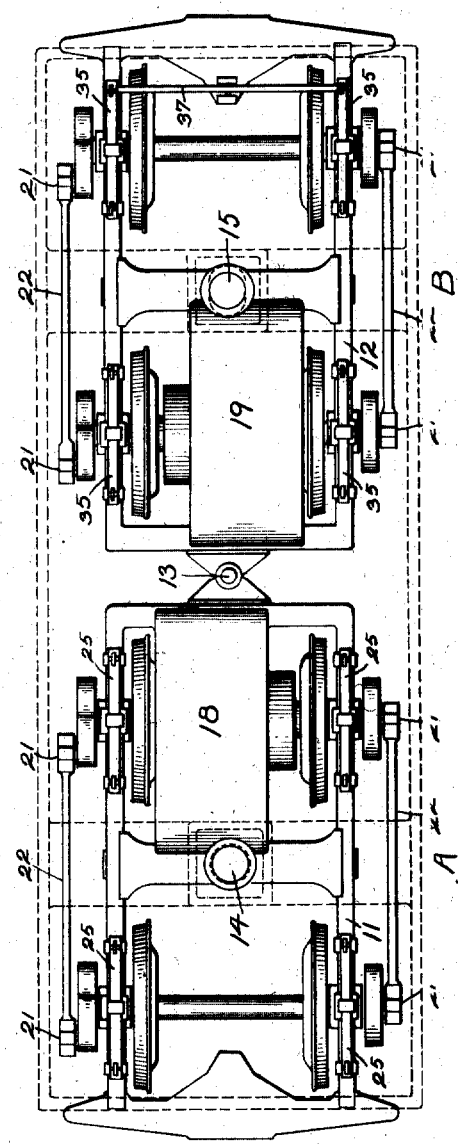

Referring to the drawing, Figure 1 is a side elevation of the trucks of a two-truck locomotive, a portion of the frame of one truck being broken away and the motor on that truck being shown in cross-section; and Fig. 2 is a plan of the trucks shown in Fig. 1, the body frame of the cab of the locomotive being shown in outline in dash lines.

Referring to Figs. 1 and 2, the trucks A and B are shown as each provided with two pairs of wheels, the axles of which are mounted for limited vertical movement in truck frames 11 and 12 of similar design. The journal boxes for these axles and the manner in which they are mounted in the truck frames need not be described here since they may be of any well known style and form no part of my invention. Each truck frame is supported upon the journal boxes of its axles by spring systems of suspension hereinafter described. The trucks are connected by a leading connection 13 of any suitable and well-known form, this connection serving as a hinged joint between the trucks through which the tractive effort of one truck is transmitted to the other, it being understood that in the particular locomotive shown the draw bars are mounted upon the truck frames. The truck A is connected to the body frame of the cab by a pivotal connection 14, of any well-known form, and the truck B is connected to the body frame by a pivotal and longitudinally sliding connection 15, also of any well-known form. The trucks A and B are provided, respectively, with motors 18 and 19 arranged in coöperative relation to the axles of said trucks which are nearest one another, or in other words, nearest the middle of the locomotive. These motors are shown as of the bipolar type in which the armature surrounds the wheel axle, the field structure of each motor being built into and forming a part of the truck frame. The manner in which the armatures of these motors are supported around the wheel axles will be fully described and claimed in a divisional application. The wheel axles of each truck are geared together by crank pins and connecting rod connections, as clearly shown in Figs. 1 and 2, the crank pins being shown at 21 and the connecting rods at 22. The cranks on each wheel axle at opposite sides of the truck are, of course, set at right angles in order that the connecting rods on both sides of the truck may never be upon dead center at the same time. The frame of the truck A is supported upon its four journal boxes by springs 25, links 26 and equalizing levers 27 duplicated on both sides of the truck and arranged as shown in the drawing. The frame of the truck B is supported upon its journal boxes through springs 35, links 36 and one equalizing lever 37 arranged as shown. This system of suspension for the motor frames is described and claimed in a divisional application.

What I claim as new and desire to secure by Letters Patent of the United States, is,

1. In an electric locomotive, two trucks each having a plurality of pairs of wheels, one motor mounted on each of said trucks adjacent to and driving the pair of wheels nearest the other truck, and driving connections between the axles of each truck, and a leading connection between said trucks.

2. In an electric locomotive, two trucks each having a plurality of pairs of wheels, one motor mounted on each truck adjacent to and driving the pair of wheels nearest the other truck, and crank and connecting rod driving connections between the wheels of each truck, and a leading connection between said trucks.

3. In an electric locomotive, two trucks each having two pairs of wheels, one motor mounted on each of said trucks adjacent to and driving the pair of wheels nearest the middle of the locomotive, crank and connecting rod driving connections between the wheels of each truck, and a leading connection between said trucks.

In witness whereof, I have hereunto set my hand this 28th day of April, 1909.

ASA F. BATCHELDER.

Witnesses:
BENJAMIN B. HULL,
HELEN ORFORD.